United States Patent Office
3,618,147
Patented Nov. 9, 1971

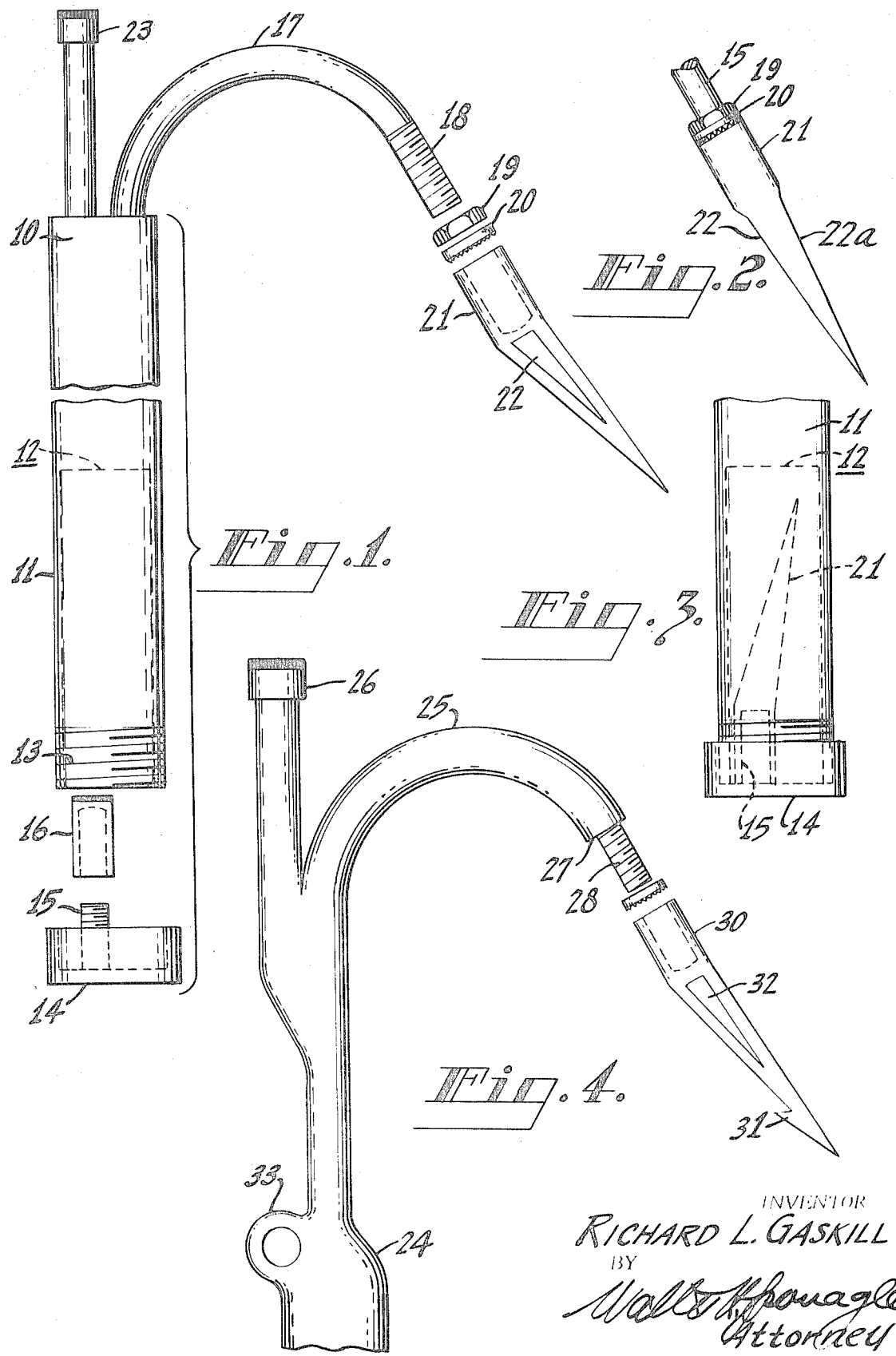

3,618,147
MULTIPURPOSE BOAT-FISHING IMPLEMENT
Richard L. Gaskill, 220 Chestnut,
Runnemede, N.J. 08078
Filed May 26, 1970, Ser. No. 40,613
Int. Cl. B25f 1/00; B65g 7/12
U.S. Cl. 7—1 H                           7 Claims

ABSTRACT OF THE DISCLOSURE

The implement is a combination boat-hook and fishing gaff comprising a pole having a threaded hollow handle at one extremity and at least a crook provided with a threaded end at the other extremity for mounting a selected one of a plurality of appliances including one with a blunt tip, when the implement is used as a boat-hook, and one with a pointed tip, when the implement is used as a fishing gaff. A cap, used to close the hollow extremity of the pole, has at least one threaded stud on which to mount a non-selected appliance for storage within the hollow pole handle.

BACKGROUND OF THE INVENTION

An implement commonly carried aboard a boat is a boat-hook which is used for docking, undocking and other operations involved in the maneuvering of a boat. When a boat also is used for fishing, another implement that usually is carried is a gaff for use in completing the catch of a fish. Each of such implements comprises a pole having a handle at one extremity and a crook at the other extremity. The tip of the crook portion of the boat-hook is blunt generally, in contrast to that of the gaff which is pointed, either with or without a barb. The boat-hook also is equipped with a substantially straight blunt-tipped push-off extension at its outer extremity. It often is inconvenient as well as potentially hazardous, particularly in relatively small boats, to carry both such implements in ready-to-use condition.

It, therefore, is an object of this invention to provide a single multipurpose implement which can be adapted for a plurality of uses, such as a boat-hook and a fishing gaff, for example.

SUMMARY OF THE INVENTION

The multipurpose implement in accordance with this invention comprises a pole, at least the handle extremity of which is hollow, having a crook at its outer extremity which may be fitted with a blunt-tipped appliance, when the implement is to be used as a boat-hook, or with a sharp-tipped appliance, when the implement is to be used as a fishing gaff. The appliance which is not in use, and other apparatus, is stored in the hollow handle of the pole. A feature of the invention is a cap, used to close the hollow extremity of the pole, which has a stud extending into the hollow handle for mounting the stored apparatus.

For a more specific disclosure of the invention reference may be had to the following detailed description of a number of illustrative embodiments thereof which is given in conjunction with the accompanying drawing, of which:

FIG. 1 is an exploded side view of a relatively small size multipurpose implement showing the manner of attachment of one appliance and the storage of another;

FIG. 2 is a fragmentary front view of a gaff type appliance showing its configuration to facilitate its mounting on and dismounting from the implement of FIG. 1;

FIG. 3 is an assembled view of the handle extremity of the implement showing the storage of the fishing gaff appliance; and FIG. 4 is a fragmentary side view, partially exploded, showing another kind of attachment of an appliance to a relatively large size multipurpose implement.

DESCRIPTION OF THE INVENTION

In FIG. 1 the multipurpose implement embodying the invention is a combination boat-hook and fishing gaff which comprises a pole 10, of which at least the handle 11 is hollow providing a recess 12. A representative pole may be formed from a length of pipe or tubing which preferably is of a strong, light-weight metal such as aluminum, for example. In such case the recess 12 will extend substantially the entire length of the pole. The end 13 of the handle 11 is externally threaded to receive an internally threaded cap 14 which, when engaged with the threaded handle end, closes the recess 12. The cap 14 has an eccentrically located threaded stud 15 adapted to mount an unused appliance, such as a blunt boat-hook tip 16, so that, when the cap is engaged with the pole handle 11, the unused appliance is stored in the recess 12.

A crook 17 is attached to the outer extremity of the pole 10, the crook being adapted for use either as a boat-hook or a fishing gaff depending upon the appliance mounted on its threaded end 18. In the illustrated example of FIG. 1 a thin nut 19 first is screwed onto the crook end 18 followed by a lock washer 20. Preferably the lock washer is an internally finned, or equivalent, type so that it engages the threads of the crook end 18 and stays in place while interchanging appliances. In FIG. 1 the selected appliance is a pointed fishing gaff tip 21 which is screwed onto the threaded crook end 18 into firm contact with the lock washer 20, the nut being adjusted so as to mount the gaff tip securely in substantially the position shown.

Transverse cross-sections of the gaff tip 21 are generally circular. As an aid in mounting and dismounting the appliance 21, diametrically opposite flattened areas 22 and 22a (see also FIG. 2) are formed thereon. These areas enable the gripping of the appliance by a wrench. Also, in order to accommodate any available one of several size wrenches, the surfaces of the areas 22 and 22a are not parallel to one another but, as best shown in FIG. 2, converge relative to one another toward the point of the tip 21.

When it is desired to convert the implement from a fishing gaff to a boat-hook, the pointed gaff tip 21 is removed from the crook 17, the cap 14 unscrewed from the handle 11, the blunt boat-hook tip 16 removed from the stud 15 and placed on the crook end 18. The gaff tip is then mounted on the stud 15 for storage in the recess 12 when the cap 14 is replaced on the pole handle 11. The pole 10 has a blunt-tipped push-off extension 23 which, although it is part of the boat-hook form of the invention, may be attached permanently to the pole because it does not interfere with the use of the implement when it is equipped as a fishing gaff.

FIG. 3 illustrates the reason for positioning the storage stud 15 eccentrically on the cap 14. Because of the configuration of the fishing gaff tip 21 an attempted mounting of it on a centrally positioned stud would cause it to strike the inside of the storage recess 12 when an attempt was made to thread the cap 14 onto the handle end 13.

In FIG. 4 a somewhat different form of a multipurpose implement embodying the invention is shown. The implement is larger than that shown in FIG. 1, but is illustrated at a reduced scale, and will be understood to have the same sort of hollow handle and studded cap for the storage of unused appliances as the device of FIG. 1. The implement has a pole 24, at the outer extremity of which is a crook 25 and a blunt-tipped push-off extension 26. Adjacent its end the crook has a shoulder 27 from which a threaded end 28 projects. A lock washer 29 of substantially the same outside diameter as that of the crook 25 is mounted on the end 28 snugly against the shoulder 27 so as to hold securely in place a selected appliance, such as a pointed fishing gaff tip 30. The outside diameter of the gaff tip 30, and of any other appliance mounted on the crook 25, is substantially the same as that of the crook. In this way, any fish brought to gaff may be slid smoothly from the pointed gaff tip 30 onto the crook 25.

In the embodiment of the invention shown in FIG. 4 the gaff tip 30 is equipped with a reflexed barb 31 so as to facilitate the handling of the larger fish for which this larger implement is intended. The barb reduces the chances of the fish sliding off of the gaff tip. As in the FIG. 1 embodiment of the invention appliances, such as the gaff tip 30, preferably have flattened areas 32 to accommodate wrenches of different sizes for mounting and dismounting the appliances. Also, this larger device is provided with a ring 33 adjacent the lower extremity of the pole 24 in which to attach a rope for use in landing a large fish.

The handle recess 12 may also be used to store other unused appliances, such as a club (not shown) for subduing large fish. The disclosed means of storing unused appliances, such as the gaff tips 21 and 30 particularly, provides a safety factor in the use of such a multipurpose implement. It also secures the unused appliances in the storage recess 12 so that they do not rattle around as in prior art devices that store unused appliances loosely in the hollow handle of an instrument.

As illustratively disclosed herein the boat-hook tip appliance 16 is an internally threaded metallic shell having a rubber, or the like, tip. Alternatively, it may be an unthreaded rubber, or the like, shell which can be quickly engaged with, and disengaged from, the threaded end 18 (FIG. 1) or 28 (FIG. 4), thereby protecting these ends when the implement is used as a boat-hook.

The nature of the multipurpose implement in accordance with this invention, together with its utility and unique aspects, has been described with reference to a number of illustrative embodiments thereof. The scope of the invention is set forth in the following claims.

I claim:
1. A multipurpose implement comprising:
    a pole having a hollow handle adjacent one extremity and a crook at its outer extremity,
    the respective ends of said handle and said crook being threaded;
    a threaded cap adapted for engagement with said threaded handle,
    said cap having a threaded stud which extends into said hollow handle upon engagement of said cap and handle;
    a plurality of appliances for use with said implement;
    means for mounting a selected one of said appliances on the threaded end of said crook; and
    means for storing non-selected ones of said appliances in said hollow pole handle,
    at least one of said non-selected appliances being engaged with said stud.
2. A multipurpose implement as defined in claim 1, wherein:
    a first one of said selected appliances is a blunt tip which, when mounted on the end of said crook, adapts the implement for use as a boat-hook.
3. A multipurpose implement as defined in claim 2, wherein:
    said outer pole extremity also has a blunt-tipped push-off extension.
4. A multipurpose implement as defined in claim 1, wherein:
    a second one of said seelcted appliances is a pointed tip which, when mounted on the end of said crook, adapts the implement for use as a fishing gaff.
5. A multipurpose implement as defined in claim 4, wherein:
    said pointed tip has generally circular cross-sections, and
    two flattened areas on opposite sides thereof for engagement by a wrench.
6. A multipurpose implement as defined in claim 5, wherein:
    the surfaces of said two flattened areas converge relative to one another toward the end of said pointed tip to enable engagement thereof by different size wrenches.
7. A multipurpose implement as defined in claim 6, wherein:
    said pointed tip appliance has a reflexed barb.

References Cited
UNITED STATES PATENTS

| | | | |
|---|---|---|---|
| 179,127 | 6/1876 | Norcross | 294—26 X |
| 2,050,194 | 8/1936 | Pflueger | 7—1 H |
| 3,072,428 | 1/1963 | Johnson | 294—26 X |

FOREIGN PATENTS

| | | | |
|---|---|---|---|
| 132,630 | 8/1951 | Sweden | 294—2 |

JAMES L. JONES, JR., Primary Examiner

U.S. Cl. X.R.

294—2, 26